United States Patent [19]
Israelsson

[11] Patent Number: 5,293,643
[45] Date of Patent: Mar. 8, 1994

[54] METHOD FOR HANDOFF IN A MOBILE RADIO COMMUNICATION SYSTEM

[75] Inventor: Per V. Israelsson, Täby, Sweden

[73] Assignee: Telefonaktiebolaget L M Ericsson, Stockholm, Sweden

[21] Appl. No.: 673,592

[22] Filed: Mar. 22, 1991

[30] Foreign Application Priority Data

Apr. 26, 1990 [SE] Sweden .................. 9001497-8

[51] Int. Cl.⁵ .................................. H04B 7/26
[52] U.S. Cl. ........................... 455/33.2; 455/56.1; 379/60
[58] Field of Search .............. 455/33.2, 54.2, 56.1; 379/60

[56] References Cited

U.S. PATENT DOCUMENTS

| | | | |
|---|---|---|---|
| 4,550,443 | 10/1985 | Freeburg | 455/33 |
| 4,704,734 | 11/1987 | Menich et al. | 455/33 |
| 4,718,081 | 1/1988 | Brenig | 379/60 |
| 4,907,290 | 3/1990 | Crompton | 455/56 |

FOREIGN PATENT DOCUMENTS

| | | |
|---|---|---|
| 0126557 | 11/1984 | European Pat. Off. |
| 0321739 | 12/1989 | Japan .................. 455/33.2 |

OTHER PUBLICATIONS

Michael Thorne, Programming The 8086/8088, 1986, 224-227.

Primary Examiner—Reinhard J. Eisenzopf
Assistant Examiner—Chi Pham
Attorney, Agent, or Firm—Burns, Doane, Swecker & Mathis

[57] ABSTRACT

The invention relates to a method in connection with handoff from a first base station in a mobile radio communication system, in which method the signal strengths from a set of base stations surrounding a mobile station are measured in the latter. When handoff is considered to be motivated, the signal strength vector formed by the measured signal strengths is correlated with stored characteristic signal strength vectors associated with the first base station. If the correlation between measured signal strength vector and one of said stored characteristic signal strength vectors exceeds a predetermined correlation level, handoff is commanded to a predetermined second base station in the set having acceptable but not the highest signal strength in the measured signal strength vector, or is the handoff procedure interrupted and the connection between the mobile station and the first base station maintained.

12 Claims, 3 Drawing Sheets

5,293,643

METHOD FOR HANDOFF IN A MOBILE RADIO COMMUNICATION SYSTEM

TECHNICAL FIELD

The present invention relates to a method in connection with handoff from a base station in a mobile radio communication system.

PRIOR ART

In mobile radio communication systems, for instance mobile telephony systems, a mobile station is in radio contact with a base station in a set of base stations located around the mobile station. When the signal strength from the current base station is weakened due to movement of the mobile station a so called handoff to another base station in the set is performed. Normally handoff is done to that base station in the set that has the highest signal strength at the mobile station at the moment in question. This method, however, sometimes leads to a non-optimal choice of base station. Under certain circumstances it would be more advantages to chose another base station among the base stations in the set that have sufficiently high signal strength at the mobile station.

DESCRIPTION OF THE INVENTION

An object of the present invention is to provide a method in connection with handoff from the first base station in a mobile radio communication system, in which signal parameters that describe the signals between a mobile station and a set of base stations located around said mobile station are measured and used for handoff decisions.

In accordance with the invention this object is achieved with a method, wherein, (a) when handoff is considered to be motivated, a signal parameter vector formed by said measured signal parameters is correlated with stored characteristic signal parameter vectors associated with said first base station; and, (b) if the correlation between said measured signal parameter vector and one of said stored characteristic signal parameter vectors exceeds a predetermined correlation level, (b1) handoff is ordered to a predetermined second base station in said set, or (b2) the handoff procedure is interrupted and the connection between said mobile station and said first base station is maintained.

DESCRIPTION OF THE DRAWING

The invention will be described more in detail below with reference to the accompanying drawings, in which.

PREFERRED EMBODIMENT

Figure 1:
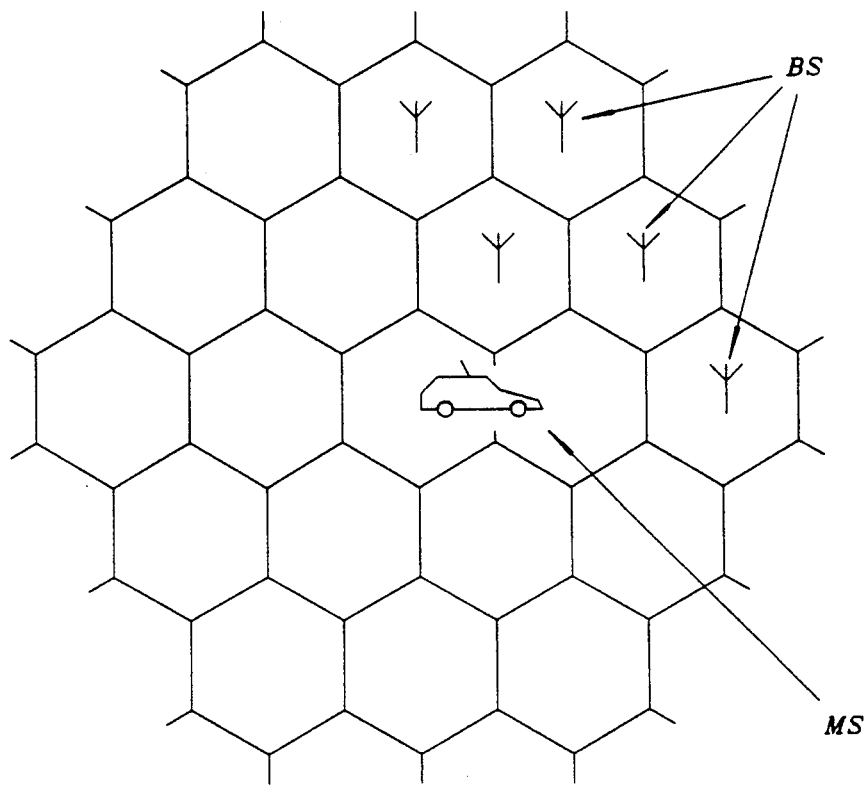
FIG. 1 shows an embodiment of a cellular mobile telephony system.

FIG. 1 shows the structure of one embodiment of a cellular mobile telephony system. Such a system comprises a number of cells, each cell in this embodiment comprising one base station BS. To simplify matters only a number of such base stations BS are shown in the figure. The base stations BS are in radio contact with a number of mobile stations MS, of which only one is shown in the figure. The mobile station MS generally communicates with the base station BS in that cell in which it is currently located. As the mobile station MS travels from cell to cell the communication from the base station BS in one cell is handed over to the base station BS in a neighbouring cell. This procedure is called handoff. During handoff the old base station instructs the mobile station MS to switch to another channel belonging to the new base station.

Figure 2:
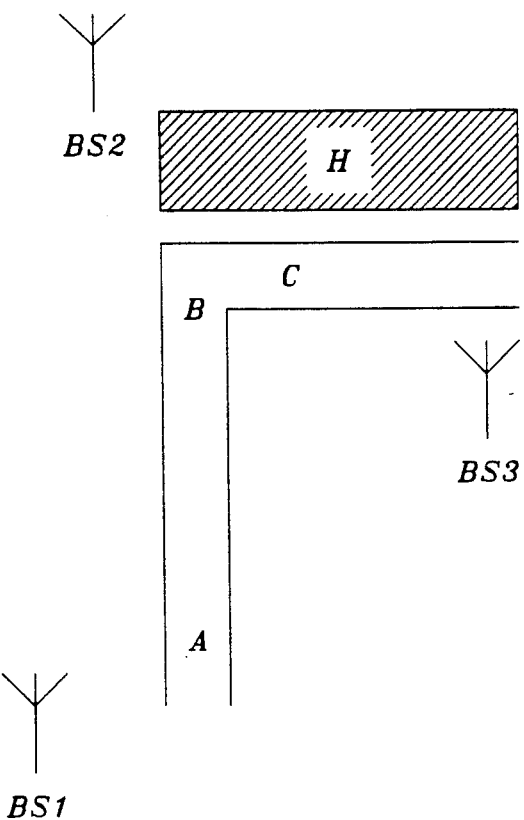
FIG. 2 shows an example of a situation where handoff should not be made to that base station that has the strongest signal.

FIG. 2 shows a situation in which handoff should not be made to the base station that has the strongest signal. In FIG. 2 there are three base stations BS1-BS3. A mobile station is assumed to be on its way from point A to point C over point B. At point A the mobile station is in contact with base station BS1. At point B the signal strength from base station BS1 has weakened so that another base station has a significantly stronger signal, and therefore handoff is ordered. Since the mobile station continuously measures the signal strength from surrounding base stations, it has been established in point B that base station BS2 has the strongest signal strength, and therefore handoff in accordance with conventional methods is ordered to this base station. As the mobile station then continuous to point C the signal from base station BS2 will be blocked by a building H so that the signal strength rapidly decreases and a new handoff has to be ordered. In this case handoff is made to base station BS3.

Thus, in the described situation a handoff decision in point B is very rapidly followed by a new handoff decision in point C. However, if base station BS3 already in point B has sufficient signal strength to take over the communication with the mobile station, it would be more suitable to order handoff already at that point to base station BS3 instead of to base station BS2.

Since the road in the described example always has the same geographical form and the point C can be reached from point A only over point B, it would therefore be desirable to somehow consider the fact that the building H soon will block signals from base station BS2 in connection with the handoff decision in point B.

The present invention is based on the insight that the geographical location of point B does not necessarily have to be characterized by the geographical coordinates of the point. An alternative way of characterizing the location of the point is by a signal strength vector formed by the signal strengths from the surrounding base stations that are measured in the mobile station. Thus, point B can be identified by a characteristic signal strength vector associated with base station BS1. The reason for this association to base station BS1 is that the specifically described situation arises only if the mobile station travels in direction ABC. Thus, only if handoff is to be made from base station BS1 to another base station is the measured signal strength vector of importance for identifying the geographical location and probable later movement of the mobile station. If, however, the mobile station travels in the opposite direction, CBA, the mobile station at point B will still be in contact with base station BS3 without requiring a handoff. Handoff to base station BS1 is made only later somewhere along the distance BA. Thus, it is essential to associate the characteristic signal strength vector with a certain base station.

An embodiment of the invention will be described more in detail below with reference to FIGS. 3 and 4.

Figure 3:
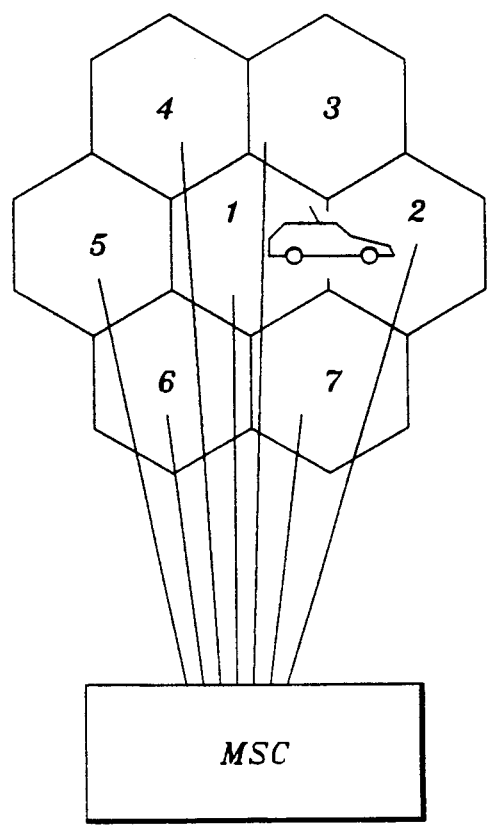
FIG. 3 shows a number of cells in a cellular mobile telephony system, the base stations of which are connected to a common mobile services switching centre.
Figure 4:
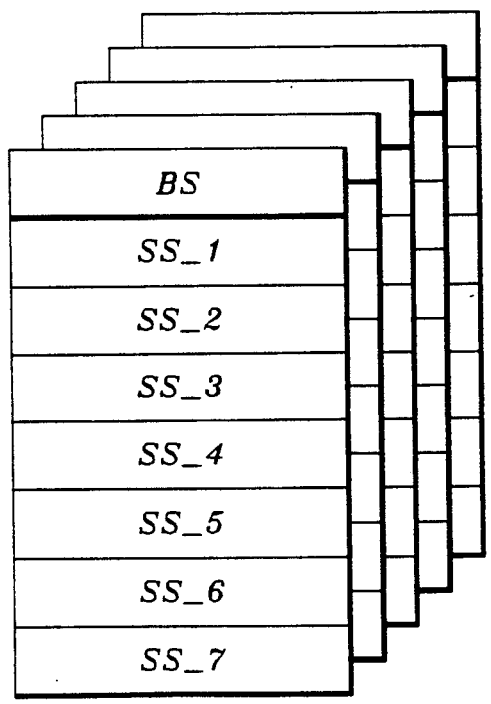
FIG. 4 shows the structure of a record in a data base for storing signal strength patterns.
Figure 5:
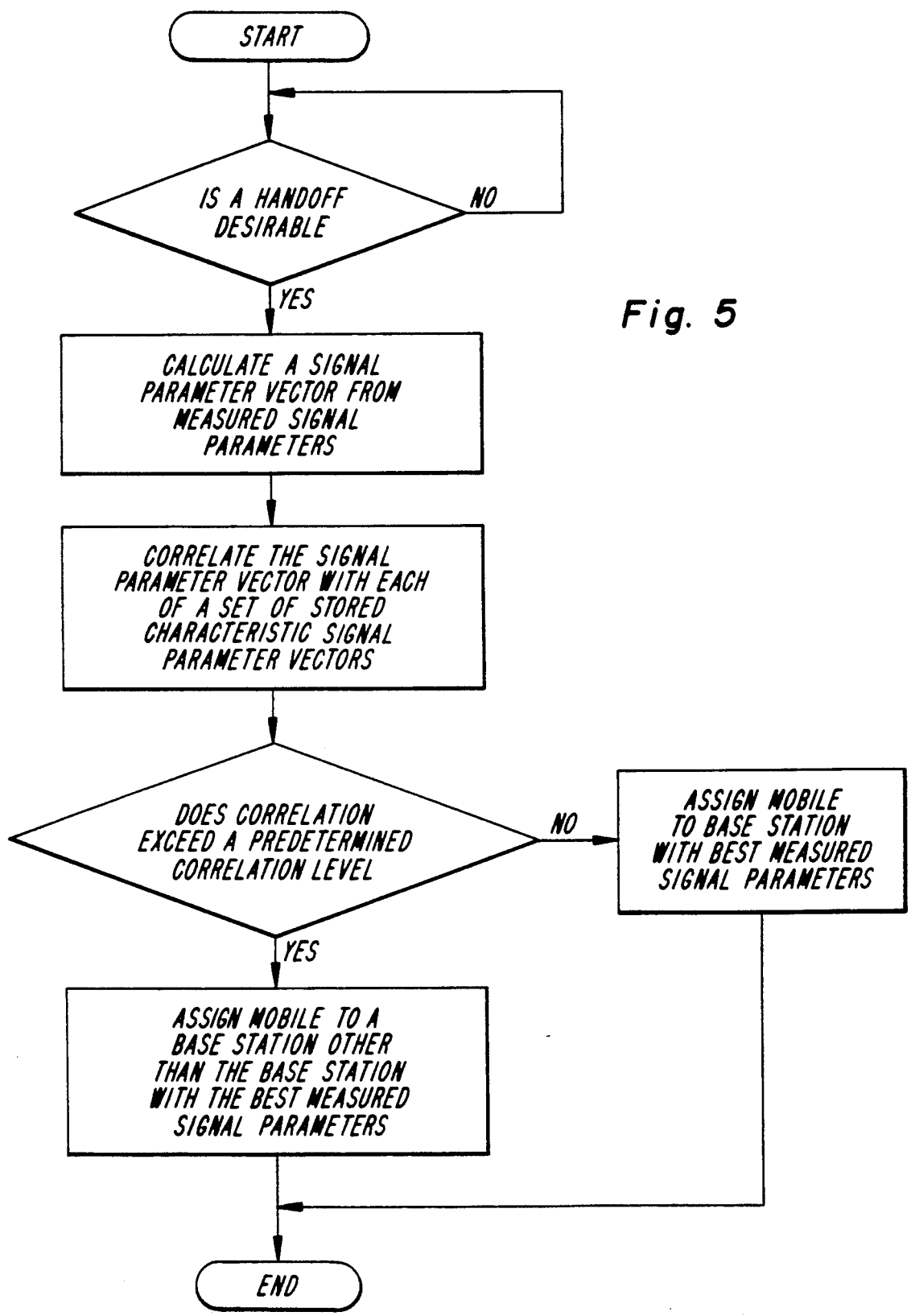
FIG. 5 illustrates a flow chart of one embodiment of the present invention.

FIG. 3 shows a set of base stations 1-7 located around a mobile station. These base stations are connected to a mobile services switching centre MSC, in which handoff decisions normally are made. In FIG. 3 all the base stations in the set that is surrounding the mobile station are connected to the same mobile services switching centre. However, this is not necessary; instead certain base stations may be connected to one mobile services switching centre while other base stations may be connected to other mobile service switching centres. In such a case the mobile services switching centres communicate with each other. However, to simplify matters the case shown in FIG. 3, where all the base stations in the set are connected to mobile services switching centre MSC will be described.

The mobile services switching centre MSC comprises a data file with characteristic signal strength vector for "exception points", for instance point B in FIG. 2. FIG. 4 shows the structure of a record in such a data file. Each record comprises a field BS that identifies a base station to which the signal strength vector belongs. The remaining fields in the record contain signal strengths SS_1-SS_7 in the exception point. Thus, on demand each base station that is connected to the mobile services switching centre MSC can be associated with a number of exception points defined by signal strength vectors stored in the data file. These signal strength vectors or signal strength patterns are measured and thereafter permanently stored in the data file and can thereafter be considered in connection with handoff decisions.

In the following it is assumed that the mobile station is in contact with base station 1 in FIG. 3 when a handoff is to be made to one of the stations 2-7. Furthermore, it is assumed that the mobile station continuously measures and reports signal strengths for surrounding base stations 1-7 to base station 1, which directs these measurement values to the mobile services switching centre MSC. When the mobile services switching centre MSC determines that the signal strengths from base stations 1-7 measured at the mobile station have changed to such levels that the conditions for handoff are fulfilled, it is investigated whether the data base stored in the mobile services switching centre MSC contains any exception points for this base station. If this is the case it is determined whether any of these are sufficiently correlated to, that is sufficiently similar to the latest signal strength vector measured by the mobile station. If the correlation is sufficient to consider the mobile station to lie in exactly the point where the characteristic signal strength vector once has been measured, a handoff is performed to another base station among stations 2-7, but not to that base station that has the strongest signal. However, the chosen base station must still have acceptable signal strength at the mobile station.

If it is determined that base station 1 is no associated with any exception points or if the last signal strength vector measured at the mobile station is not sufficiently correlated with any of the characteristic signal strength vectors for base station 1, a handoff is performed in a conventional way to that base station 2-7 that has the strongest signal.

The correlation between a signal strength vector measured at the mobile station and a characteristic signal strength vector in the data file can easily be performed for instance by calculating the absolute value of the difference between respective vector components to form a deviation vector. This deviation vector can then be compared to a stored deviation vector. If a sufficient number of components in the calculated deviation vector are smaller than the corresponding components in the stored deviation vector sufficient correlation is assumed to exist. The stored deviation vector can be common for all characteristic signal strength vectors or be unique for each characteristic signal strength vector.

In certain situations, for instance when signals from base station 1 temporarily are blocked by a building, the most suitable procedure can be to completely interrupt the handoff procedure since according to experience base station 1 shortly thereafter will have an acceptable signal strength again.

In the above example the invention has been described in connection with signal strength vectors that are reported by the mobile station MS to the base station BS. However, the mobile station can also measure and report other parameters that describe received signals. These parameters can also be of interest in connection with a handoff decision. Examples of such parameters are:

the bit error rate (BER) of signals transmitted from at least one of the base station 1-7;

the time dispersion, TD, of signals transmitted from at least one of the base stations 1-7; and the ratio, C/I, between the signal strength of the carrier that has been transmitted from at least one of the base stations 1-7 and interfering signals.

A generalisation of the described embodiment of the invention is therefore to replace the signal strength vector with a signal parameter vector. The principals described above can then still be used if the mobile station instead measures the signal parameter vector and this vector is compared to stored characteristic signal parameter vectors.

In an embodiment where parameters other than signal strength are considered it is possible that handoff in an exception point is ordered to that base station that has the strongest signal after all. It can for instance happen that these further parameters do not have acceptable values for any other than the strongest base station.

In the described embodiment of the invention to simplify matters it has been assumed that signal parameters are measured in the mobile station and reported to a base station. However, this is not necessary. An equivalent way to obtain signal parameters is for instance to let the base station measure parameters that describe the signal that is transmitted by the mobile station and received by the respective base stations. These parameters can then by each base station be reported to the unit that makes handoff decisions, for instance a mobile services switching centre. These signal parameters also form a signal parameter vector that characterizes the geographic location of the mobile station.

The signal parameters in such an embodiment can comprise at least one of the signal strengths measured at the base stations 1-7 in the set of a signal transmitted by the mobile station MS.

Further examples of signal parameters in this embodiment can comprise at least one of:

the bit error rate, BER, of a signal transmitted by the mobile station MS as measured at at least one base station 1-7 in the set;

the time dispersion, TD, of a signal transmitted by the mobile station MS as measured at at least one base station 1-7 in the set;

the ratio, C/I, between the signal strength of the carrier transmitted by the mobile station MS and interfering signals as measured at at least one base station 1-7 in the set.

Thus, with the present invention it is possible to provide more differentiated conditions for handoff, that is to deviate from the condition that handoff is to be made to the base station that has the strongest signal in certain situations. Instead handoff can be made to some other predetermined base station or the connection with the original base station can be maintained until the next handoff request.

The man skilled in the art appreciates that different changes and modifications of the invention are possible without deviation from the scope of the invention, which is defined by the appended patent claims.

I claim:

1. A method for handoff from a first base station in a cellular mobile radio communication system, in which signal parameters that describe, the reliability of signals between a mobile station and a set of base stations including a second base station surrounding said mobile station are measured and used by a mobile services switching center for handoff decisions, said method comprising the steps:

(a) calculating, when handoff is considered to be motivated, from said measured signal parameters a signal parameter vector which characterizes the geographical location of said mobile station within the cell that is associated with said first base station;

(b) correlating said signal parameter vector with each of set of stored characteristic signal parameter vectors associated with said first base station, each characteristic signal parameter vector characterizing a predetermined location in said cell; and (c) assigning said mobile station to a base station in said set of base stations other than said second base station, said second base station having the measured signal parameters corresponding to the most reliable signal, when said correlation between said measured signal parameter vector and one of said stored characteristic signal parameter vectors exceeds a predetermined correlation level.

2. The method of claim 1, wherein said signal parameters comprise at least one of the signal strengths of signals transmitted from said base stations in said set as measured at said mobile station.

3. The method of claim 1, wherein said signal parameters comprise at least one of:

the bit error rate of signals transmitted from at least one base station in said set;

the time dispersion of signals transmitted from at least one base station in said set; and the ratio between the signal strength of the carrier that has been transmitted from at least one base station in said set and interfering signals.

4. The method of claim 1, wherein said signal parameters comprise at least one of the signal strengths measured at said base stations in said set of a signal transmitted by said mobile station.

5. The method of claim 4, wherein said signal parameters comprise at least one of:

the bit error rate of a signal transmitted by said mobile station as measured at at least one base station in said set;

the time dispersion of a signal transmitted by said mobile station as measured at at least one base station in said set; and the ratio between the signal strength of the carrier transmitted by said mobile station and interfering signals as measured at at least one base station in said set.

6. The method of claim 1, wherein handoff in step (c) is ordered to a base station having an acceptable but not the highest signal strength in said measured signal parameter vector.

7. The method of claim 1, wherein said characteristic signal parameter vectors that are associated with said first base station are stored in a handoff decision means.

8. The method of claim 7, wherein said characteristic signal parameter vectors are stored as records in a data file, in which each record comprises a data field with an identification code for a base station and data fields for signal parameters of characteristic signal parameter vectors associated with this base station.

9. The method of claim 7, wherein said handoff decision means stores characteristic signal parameter vectors for all the base stations that are connected thereto.

10. A method for handoff according to claim 1, wherein said handoff is interrupted and said mobile station remains assigned to said first base station when said signal parameter vector for said mobile station corresponds to a predetermined stored characteristic signal parameter vectors.

11. A method for handoff according to claim 1, wherein said mobile station is assigned to said second base station when said correlation does not exceed a predetermined correlation level.

12. A method for handoff according to claim 1, wherein said mobile station is assigned to a predetermined base station.

* * * * *